Jan. 29, 1957  E. A. SNOW  2,779,360
GAUGE FOR CUT-OFF SAW TABLES AND THE LIKE
Filed Oct. 3, 1955

INVENTOR.
EUGENE A. SNOW
BY C. G. Stratton
ATTORNEY

United States Patent Office 2,779,360
Patented Jan. 29, 1957

2,779,360

GAUGE FOR CUT-OFF SAW TABLES AND THE LIKE

Eugene A. Snow, Lynwood, Calif.

Application October 3, 1955, Serial No. 537,976

4 Claims. (Cl. 143—174)

This invention relates to a gauge construction for cut-off saw tables and the like.

An object of the present invention is to provide a quickly set-table gauge that is gravitationally self-locking.

Cut-off saw tables, of course, operate in an atmosphere of wood shavings and dust and the same are sometimes located in the open without protection from the weather, particularly, rain. Therefore, gauge structures for cut-off saw tables and the like frequently clog under accumulations of both dry and wet sawdust and also rapidly deteriorate under rust and corrosion resulting from poorly drained moisture.

Recognizing the foregoing faults, it is another object of the invention to provide a cut-off gauge that is self-cleaning of sawdust accumulations, is protected from rain, and readily drains off moisture that may reach the wear surfaces.

A further object of the present invention is to provide a gauge structure that, in the main, can be constructed of stock parts which require but little machining to thereby provide for low cost of production with attending long wear.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 1:
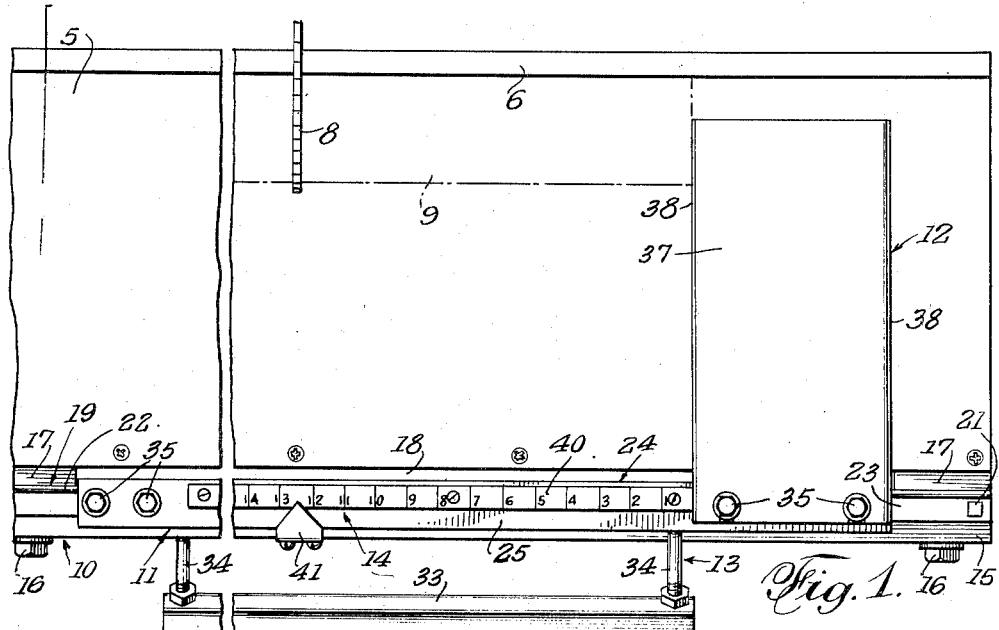
Fig. 1 is a broken plan view of a cut-off saw table provided with an adjustable gauge according to the present invention.
Figure 2:
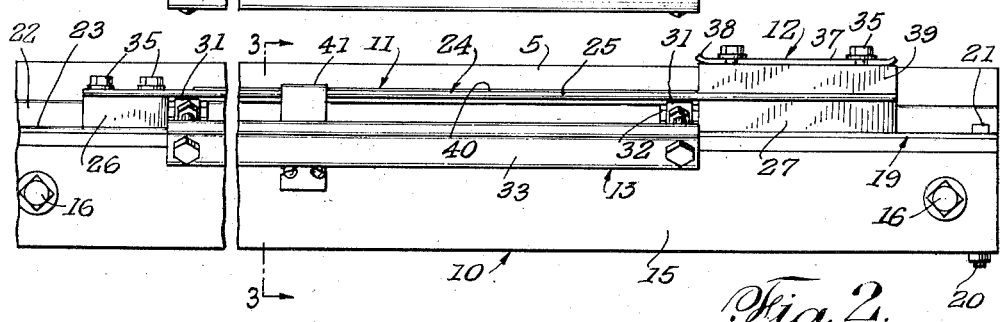
Fig. 2 is a front elevational view thereof.

The saw table that is illustrated comprises a table top 5 that has a rearwork-locating guide rail 6 and a front apron 7. A cutter 8 is shown in association with the above-described table for cutting through or into a workpiece 9 positioned against guide rail 6. Transverse movement of this cutter performs the cutting operation. The present gauge means is provided for positioning the workpiece 9 accurately with relation to the cutter 8.

The gauge structure that is illustrated comprises, generally, an elongated front rail 10 affixed to the table apron 7, longitudinally movable means 11 slidingly supported by rail 10, a gauge arm 12 carried by the means 11 and in transverse position relative to table 5, means 13 to gravitationally lock the rail 10 and the means 11 against movement of the latter, and scale means 14 for locating the means 11 and, therefore, the gauge arm 12 in proper relation to cutter 8.

Figure 3:
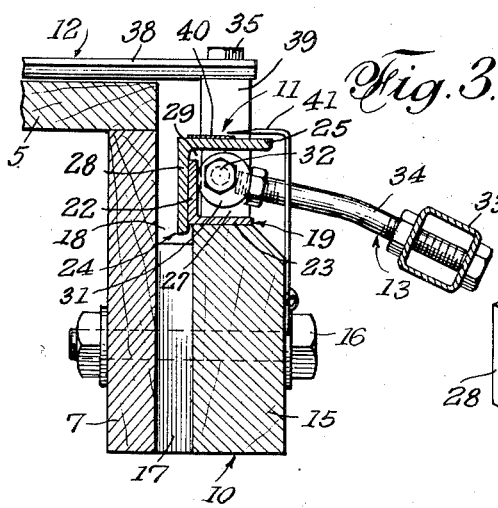
Fig. 3 is an enlarged cross-sectional view as taken on line 3—3 of Fig. 2.
Figure 4:
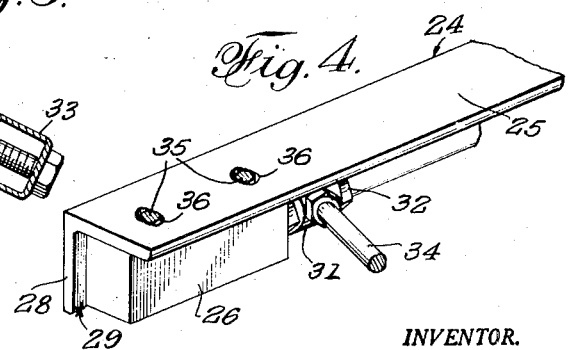
Fig. 4 is a fragmentary perspective view of a feature of the construction.

The rail 10 is shown as comprising a wooden bar 15 affixed to apron 7 by bolts 16 and spaced from said apron by spacers 17. The resulting space 18 allows for drainage of moisture between the front of table 5 and rail 10 and also for passage of saw dust from above. The rearward portion of the means 11 is maintained clear of table 5 and its apron 7 by reason of space 18, as best seen in Fig. 3.

Said rail 10 also includes a steel angle rail 19 that is affixed to the top of bar 15, as by bolts 20, the heads 21 thereof serving as stops limiting the longitudinal movement of the means 11. Said rail 19 is arranged with its vertical flange 22 at the rear (see Fig. 3). Since rail 19 may be eighteen or more feet in length, the same may be made of two end abutted angle rails, if the great length is inconvenient for shipping. In such case, the butting ends may be fastened to bar 15 by under flush countersunk head screws or the like so as to leave the upper face of horizontal rail flange 23 clear of obstruction.

The longitudinally movable means 11 is shown as comprising a steel angle rail 24 that has a horizontal flange 25 to which is affixed end blocks 26 and 27 in spaced relation to the vertical flange 28 of said rail 24. The space 29, thus formed, is substantially wider than flange 22 of rail 19, as can be seen from Fig. 3. Also, said blocks 26 and 27 are of such height that, when resting on flange 23, the upper edge of flange 22 is clear of and substantially spaced from flange 25.

From this structure, it will be evident that rail 24 is freely slidable along rail 19, the under faces of blocks 26 and 27 sliding along the upper face of rail flange 23, with the rail flange 22 extending freely into space 29.

Said means 11 mounts the means 13 for creating a friction between the outer face of fixed rail flange 22 and the inner face of movable rail flange 28, said friction being effective along the entire length of contact between flanges 22 and 28, is of such magnitude as to lock the rails together against movement of the rail 28.

The means 13 is shown as a pair of circular and eccentric members 31 mounted on the ends of blocks 26 and 27 on pivot bolts 32 and so weighted as to turn on said pivots in a direction to engage the inner face of rail flange 22. Thus, the weight provided will cause firm frictional engagement between flanges 22 and 28 although but two cams or eccentrics 31 are used to effect such friction.

The weight for actuating the cams is shown as an elongated handle bar or tube 33 that is connected by forwardly extending stud arms 34 to said cams. Immediate release of the means 11 for adjusting movement thereof is readily effected by lifting on handle bar 33 so as to relieve the mentioned friction.

Screws or bolts 35 affix blocks 26 and 27 to rail 24 and clearance holes or slots 36 in the flange 25 of said rail permit such location of said blocks and the cams carried thereby that both cams function with similar effect to create the mentioned gauge-locking friction.

The gauge arm 12 preferably comprises a metal sheet 37 having its opposite edges 38 somewhat upturned, as shown, to impart rigidity to said sheet and comprise the work-piece-stopping edges of the gauge. The screws 35 that enter block 27 affixed said gauge plate to rail 24, a spacer block 39 being used to bring said gauge arm above and clear of the top 5 of the table.

The scale means 14 is shown as a graduated scale 40 affixed to the upper face of flange 25, and an index member 41 that is adjustably carried by rail 10 and, more specifically, is affixed to bar 15.

It will be noted that a manual lock for the gauge is not needed and practice has demonstrated that the friction created between flanges 22 and 28 is of such magnitude that, even when a work-piece is pushed, with considerable force, against the gauge arm 12, there is no shift of the gauge from the set position. Yet, a simple lift on handle bar 33 frees the gauge for movement to another position.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A gauge for a cut-off saw table and the like comprising a rail disposed along the front of the table and having a horizontal flange and a vertical flange at the rear of the horizontal flange, a graduated elongated gauge-mounting member over the rail and provided with means resting on the horizontal flange of the rail to support the member in spaced relation above the rail, said member being provided with a vertical flange alongside of and rearward of the vertical flange of the rail, and weighted eccentric cam means carried by the elongated member in spaced relation to the vertical flange thereof and in engagement with the vertical flange of the rail to frictionally engage said vertical flanges.

2. A gauge according to claim 1: the means on the elongated member that rest on the horizontal flange of the rail comprising longitudinally spaced blocks, and the weighted cam means being carried by said blocks in the space therebetween.

3. A gauge construction comprising a fixed metal angle-sectioned rail, an angle-sectioned member shorter than the rail and disposed over the rail, the vertical flanges of the rail and member being in side-by-side relation with the flange of the member rearward of the flange of the rail, longitudinally spaced support blocks carried by the member and engaged with the horizontal flange of the rail to support the longitudinal member, a gauge arm carried by said member and extending transversely therefrom, and gravity weighted means carried by the member to draw said vertical flanges into frictional engagement throughout the length of the member to, thereby, lock said member and the gauge arm to the rail.

4. A gauge construction according to claim 3: transversely adjustable means connecting the support blocks to the member.

References Cited in the file of this patent

UNITED STATES PATENTS

| | | |
|---|---|---|
| 1,566,225 | Mills | Dec. 15, 1925 |
| 2,265,335 | Aumann | Dec. 9, 1941 |
| 2,518,728 | Snow | Aug. 15, 1950 |
| 2,630,845 | Eschenburg | Mar. 10, 1953 |
| 2,675,033 | Hess | Apr. 13, 1954 |
| 2,696,854 | Woodruff | Dec. 14, 1954 |